(12) United States Patent
Kalina

(10) Patent No.: US 7,350,471 B2
(45) Date of Patent: Apr. 1, 2008

(54) COMBUSTION SYSTEM WITH RECIRCULATION OF FLUE GAS

(75) Inventor: Alexander I. Kalina, Hillsborough, CA (US)

(73) Assignee: Kalex LLC, Belmont, CA (US)

( * ) Notice: Subject to any disclaimer, the term of this patent is extended or adjusted under 35 U.S.C. 154(b) by 207 days.

(21) Appl. No.: 11/069,769

(22) Filed: Mar. 1, 2005

(65) Prior Publication Data

US 2006/0199120 A1  Sep. 7, 2006

(51) Int. Cl.
*F23L 7/00* (2006.01)

(52) U.S. Cl. .................. 110/348; 110/342; 110/204; 122/479.2

(58) Field of Classification Search ............. 110/342, 110/345, 347, 348, 204, 205
See application file for complete search history.

(56) References Cited

U.S. PATENT DOCUMENTS

| | | | |
|---|---|---|---|
| 3,146,761 A | 9/1964 | Blodgett | 122/479 |
| 4,739,713 A * | 4/1988 | Vier et al. | 110/263 |
| 6,035,642 A * | 3/2000 | Peletz et al. | 60/649 |
| 6,735,948 B1 | 5/2004 | Kalina | 60/649 |
| 6,769,256 B1 | 8/2004 | Kalina | 60/653 |
| 6,820,421 B2 | 11/2004 | Kalina | 60/649 |
| 6,829,895 B2 | 12/2004 | Kalina | 60/649 |
| 6,910,334 B2 | 6/2005 | Kalina | 60/651 |
| 6,923,000 B2 | 8/2005 | Kalina | 60/649 |
| 6,941,757 B2 | 9/2005 | Kalina | 60/649 |
| 6,968,690 B2 | 11/2005 | Kalina | 60/649 |
| 7,021,060 B1 | 4/2006 | Kalina | 60/649 |
| 7,043,919 B1 | 5/2006 | Kalina | 60/651 |
| 7,055,326 B1 | 6/2006 | Kalina | 60/649 |
| 7,065,967 B2 | 6/2006 | Kalina | 60/649 |
| 7,065,969 B2 | 6/2006 | Kalina | 60/670 |
| 2005/0051654 A1 | 3/2005 | Kalina | 203/21 |
| 2006/0096288 A1 | 5/2006 | Kalina | 60/649 |
| 2006/0096290 A1 | 5/2006 | Kalina | 60/649 |
| 2006/0165394 A1 | 7/2006 | Kalina | 392/386 |

FOREIGN PATENT DOCUMENTS

| | | | |
|---|---|---|---|
| EP | 1217299 | 6/2002 | |
| EP | 1254696 | 6/2002 | |
| EP | 1331444 | 7/2003 | |
| FR | 111178 | 3/1956 | |
| GB | 340780 | 1/1931 | |
| GB | 504114 | 4/1939 | |
| GB | 798786 | 7/1958 | 123/3 |
| WO | WO 2004109075 | 12/2004 | |

OTHER PUBLICATIONS

U.S. Appl. No. 11/514,290, filed Aug. 31, 2006, Kalina.

(Continued)

*Primary Examiner*—Kenneth Rinehart
(74) *Attorney, Agent, or Firm*—Robert W Strozier

(57) ABSTRACT

An improved combustion method and corresponding apparatus is disclosed, where the method includes oxidizing a fuel in a combustion chamber with an oxidizing stream including an air stream and a first recycled flue gas stream and mixing a produced hot flue gas stream with a second recycled flue gas stream to form reduced temperature flue gas stream which can be used directly in a power generator or to heat a reactor. The method and apparatus allow flow rates of the streams to be adjusted so that temperatures in the combustion chamber and in the heat transfer unit or units of the power generator or reactor can be kept below temperature that would thermally damage the combustion chamber, heat transfer unit or units or the reactors.

12 Claims, 4 Drawing Sheets

OTHER PUBLICATIONS

U.S. Appl. No. 11/399,287, filed Apr. 5, 2006, Kalina.
U.S. Appl. No. 11/399,306, filed Apr. 5, 2006, Kalina.
U.S. Appl. No. 11/238,173, filed Sep. 28, 2005, Kalina.
U.S. Appl. No. 11/235,654, filed Sep. 22, 2005, Kalina.
U.S. Appl. No. 11/227,991, filed Sep. 15, 2005, Kalina.
PCT International Search Report and Written Opinion.

* cited by examiner

COMBUSTION SYSTEM WITH RECIRCULATION OF FLUE GAS

BACKGROUND OF THE INVENTION

1. Field of the Invention

The present invention relates to the field of combusting fuels with the aim of supplying heat to thermal power plants and/or for other purposes.

More particularly, the present invention relates to a combustion apparatus including a combustion chamber, a source of air and a flue gas recirculation system and methods for making and using same.

2. Description of the Related Art

In the process of the combustion of fuels, a minimum quantity of air, that is theoretically necessary for complete combustion of the fuel, is such that all oxygen contained in the air supplied to the combustion is completely consumed or used. Such a process is referred as a stoichiometric process, and corresponds to the highest temperature in the combustion zone given a combustion process that uses air as the oxidant.

However, in actual practice, all current industrially used combustion systems operate with some excess of air, i.e., an amount of air in excess of the stoichiometric amount, that is necessary to assure the complete combustion of the fuel. This excess air results in a lowering of the temperature of combustion. The greater the excess of air, the lower the temperature of combustion and the less heat available for conversion to a useable from of energy.

However, the greater the excess of air, the greater the flow rate of the produced flue gases. Because the flue gas cannot be cooled to a temperature equal to the initial temperature of the supplied air, the quantity of heat rejected into the atmosphere by the flue gas increases with increasing amounts of excess air. This results in a reduction of the efficiency of the combustion system.

Therefore, in conventional combustion systems, in order to operate with a minimum of excess of air, the tubes in which the boiling of a working fluid of a power cycle occurs, (so-called "waterwall" tubes), are located directly in the combustion zone. This allows the heat of combustion to be partially absorbed by the boiling of the working fluid, and thus controls the temperature in the combustion zone. Such systems are known as conventional boiler combustion systems. These systems are, perforce, expensive and complex structures that require a high degree of maintenance, especially due to the fact that the waterwall tubes are subjected to very high thermal stresses.

On the other hand, in so-called fluidized bed combustors, (which have several advantages), the excess of air is usually very high due to the fact that there is a substantial flow of air needed to maintain the fluidized bed. As a result, fluidized bed boiler/combustors have substantially reduced efficiencies.

In general, it would be extremely desirable, and would present a great simplification, if combustion were to be performed in a separate combustion chamber without the need for internal cooling by waterwall tubes, while at the same time operating with a minimum of excess air. All heat produced by the combustion would thus be accumulated in a stream of hot flue gas which could then be utilized in a heat recovery steam generator (HRSG) or a heat recovery vapor generator (HRVG). HRSG and HRVG systems are relatively simple heat exchangers which are substantially less expensive than conventional boilers. A combustion system with such a structure would be substantially more reliable and less expensive than a conventional boiler/combustion system.

But in such a case, the temperature in the combustion chamber would become unacceptably high, such that the materials out of which the combustion chamber is constructed would be unable to withstand such temperatures. Moreover, the flue gases produced would have such a high temperature that they would not be able to be used directly to provide heat to the heat exchangers of a power system, especially if these heat exchangers are used to superheat vapor.

Separate combustion chambers, without internal waterwall cooling, have been used for the combustion of low quality fuels, particularly those with high water contents, such as biomass. However, even in these cases, the temperature of the flue gas produced is too high to be directly used in the heat exchangers of a power system.

Usually, in such cases, the hot flue gas is used to heat an intermediate heat carrying fluid, which in its turn is then used to provide heat to the heat exchangers of the power system. However such an arrangement results in the addition of substantial complications to the entire system.

Thus, there is a need in the art for a combustion apparatus that can utilize heat recovery steam generator (HRSG) or a heat recovery vapor generator (HRVG), which are relatively simple heat exchangers, in combustion systems allowing substantially less expensive and complex systems to be designed and constructed.

SUMMARY OF THE INVENTION

The present invention provides a method for utilizing combustion gases or flue gases as a heat source for a power system or other system requiring thermal energy, where the method includes the steps of supplying a stream comprising air and a first cooled recycled flue gas stream to a combustion chamber having an air inlet, a fuel inlet and a flue gas outlet. A hot combustion gas or flue gas stream is then mixed with a second cooled recycled flue gas stream to form a heat transfer stream. The heat transfer stream is then brought into a heat exchange relationship with a stream to be heated such as a working fluid stream of a power extraction system or a stream associated with a chemical conversion unit or a chemical reactor. The method and apparatus of this invention allow flow rates of the streams in the method or apparatus to be adjusted so that temperatures in the combustion chamber and in the heat transfer unit or units of the power generator or reactor can be kept below temperature that would thermally damage the combustion chamber, heat transfer unit or units or the reactors.

The present invention also provides a method for combusting a fuel including the step of feeding a fuel stream and an oxidizer stream to a combustion chamber, where the oxidizer stream includes a sufficient amount of air to convert all combustible components of the fuel to oxides and a sufficient amount of a cooled recycled flue gas stream to moderate the temperature of a produced hot flue gas stream. The hot flue gas stream is then mixed with another cooled recycled flue gas stream to form a heat transfer stream. The heat transfer stream is then used to heat a desired stream or to heat a desired unit or a desired component of a unit.

The present invention provides a method for converting thermal energy into a useable form of energy including the step of feeding a fuel stream and an oxidizer stream to a combustion chamber, where the oxidizer stream includes a sufficient amount of air to convert all combustible components of the fuel to oxides and a sufficient amount of a cooled recycled flue gas stream to moderate the temperature of a produced hot flue gas stream. The hot flue gas stream is then mixed with another cooled recycled flue gas stream to form a heat transfer stream. The heat transfer stream is then used to vaporize or vaporize and super heat a working fluid stream of a power extraction system which is then transferred to a useable form of energy and returned to be vaporized or vaporized ans super heated in a thermodynamic cycle.

The present invention also provides a combustion apparatus including a combustion chamber, an air source, a fuel source, and a flue gas recycling system, where the combustion chamber is designed to receive a fuel stream from the fuel source and an oxidizing stream including an effective amount of air from the air source and an effective amount of cooled flue gas from the recycling system. The effective amount of air is sufficient of provide a stoichiometric amount of oxygen to fuel or a slight excess above the stoichiometric amount, where slight means a 25% or less excess of oxygen to fuel. The effective amount of a cooled recycled flue gas is sufficient to moderate a temperature of a produced flue gas stream. The recycle system includes a mixer, at least two splitters and a fan. The fan is designed to increase a pressure of a spent flue gas stream, a flue gas stream after the stream has transferred a portion of its energy to an external system. The mixer is designed to mix the hot fine gas stream with another effective amount of a cooled recycled flue gas stream to form a heat transfer stream from which the portion of its thermal energy is transferred tote external system. The splitters are designed to split the spent flue gas stream into a rejected portion and a recycle portion. The recycle portion is forwarded to the stream the fan and then split into the two cooled recycle flue gas streams.

DESCRIPTION OF THE DRAWINGS

The invention can be better understood with reference to the following detailed description together with the appended illustrative drawings in which like elements are numbered the same.

DETAILED DESCRIPTION OF THE INVENTION

Figure 1A:
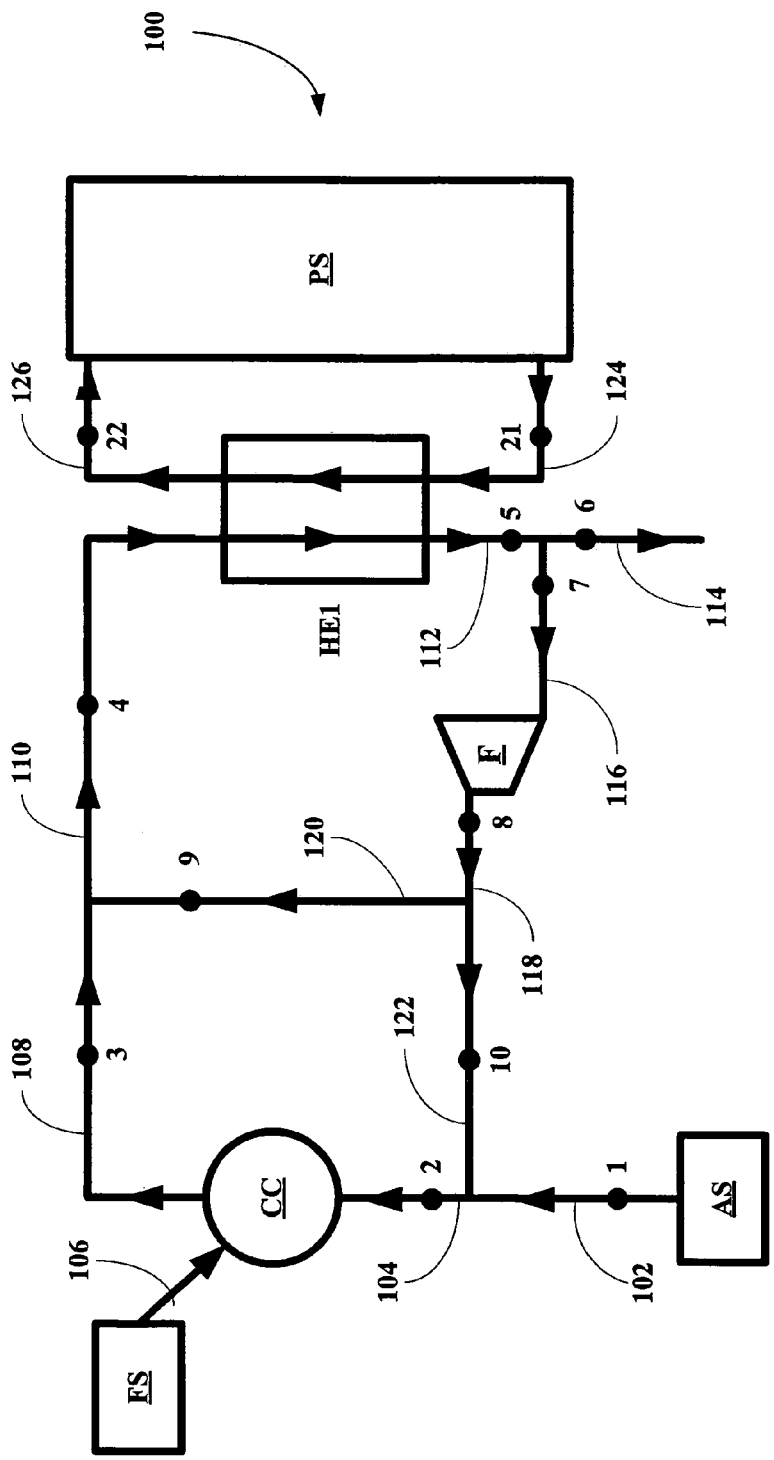
FIG. 1A depicts a preferred embodiment of a combustion apparatus of this invention feeding a power supply system.

The inventors have found that a combustion apparatus can be constructed that allows combustion of fuels with a minimum excess of air, in order to attain a high efficiency, and at the same time allows effective control of temperatures in combustion chambers and temperatures of produced flue gases. The design allows direct utilization of heat in type heat exchangers used in heat recovery steam generator (HRSG) or a heat recovery vapor generator (HRVG). The designs of this invention are simpler and more cost effective than prior art combustion apparatuses. In one embodiment of the combustion method and corresponding apparatus of this invention, the temperature of the moderate temperature flue gas stream supplied to the heat exchangers of generators can range between about 1000° F. and about 250° F. In another embodiment, the temperature ranges between about 800° F. and about 250° F. In another embodiment, the temperature ranges between about 600° F. and about 250° F. The method is also designed to maintain a temperature in the combustion chamber below a temperature that would adversely affect the combustion chamber. In one embodiment the temperature inside the combustion chamber is maintained at or below about 2560° F. and about 1200° F. In another embodiment, the chamber temperature is maintained at or below about 2400° F. and about 1200° F. In another embodiment, the chamber temperature is maintained at or below about 2200° F. and about 1200° F.

The present invention relates broadly to a method for combusting fuels with the aim of supplying heat to thermal power plants and/or for other heating purposes, where the method includes the step of supplying a stream comprising air and a first cooled recycled flue gas stream to a combustion chamber to produce a hot combustion gas or flue gas stream. The hot combustion flue gas stream is then mixed with a second cooled recycled flue gas stream to form a heat transfer stream. The heat transfer stream is then brought into a heat exchange relationship with a stream to be heated such as a working fluid stream of a power extraction system or with a stream associated with a chemical conversion unit or with a chemical reactor.

The present invention also relates broadly to a method for combusting a fuel including the step of feeding a fuel stream and an oxidizer stream to a combustion chamber, where the oxidizer stream includes a sufficient amount of air to convert all combustible components of the fuel to oxides and a sufficient amount of a cooled recycled flue gas stream to moderate the temperature of a produced hot flue gas stream. The hot flue gas stream is then mixed with another cooled recycled flue gas stream to form a heat transfer stream. The heat transfer stream is then used to heat a desired stream or to heat a desired unit or a desired component of a unit.

The present invention also broadly relates to a combustion apparatus including a combustion chamber, an air source, a fuel source, and a flue gas recycling system, where the combustion chamber is designed to receive a fuel stream from the fuel source and an oxidizing stream including an effective amount of air from the air source and an effective amount of cooled flue gas form the recycling system. The effective amount of air is sufficient of provide a stoichiometric amount of oxygen to fuel or a slight excess above the stoichiometric amount, where slight means a 25% or less excess of oxygen to fuel. The effective amount of a cooled recycled flue gas is sufficient to moderate a temperature of a produced flue gas stream. The recycle system includes a mixer, at least two splitters and a fan. The fan is designed to increase a pressure of a spent flue gas stream, a flue gas stream after the stream has transferred a portion of its energy to an external system. The mixer is designed to mix the hot flue gas stream with another effective amount of a cooled recycled flue gas stream to form a heat transfer stream from which the portion of its thermal energy is transferred to the external system. The splitters are designed to split the spent flue gas stream into a rejected portion and a recycle portion. The recycle portion is forwarded to the stream the fan and then split into the two cooled recycle flue gas streams.

Figure 1B:
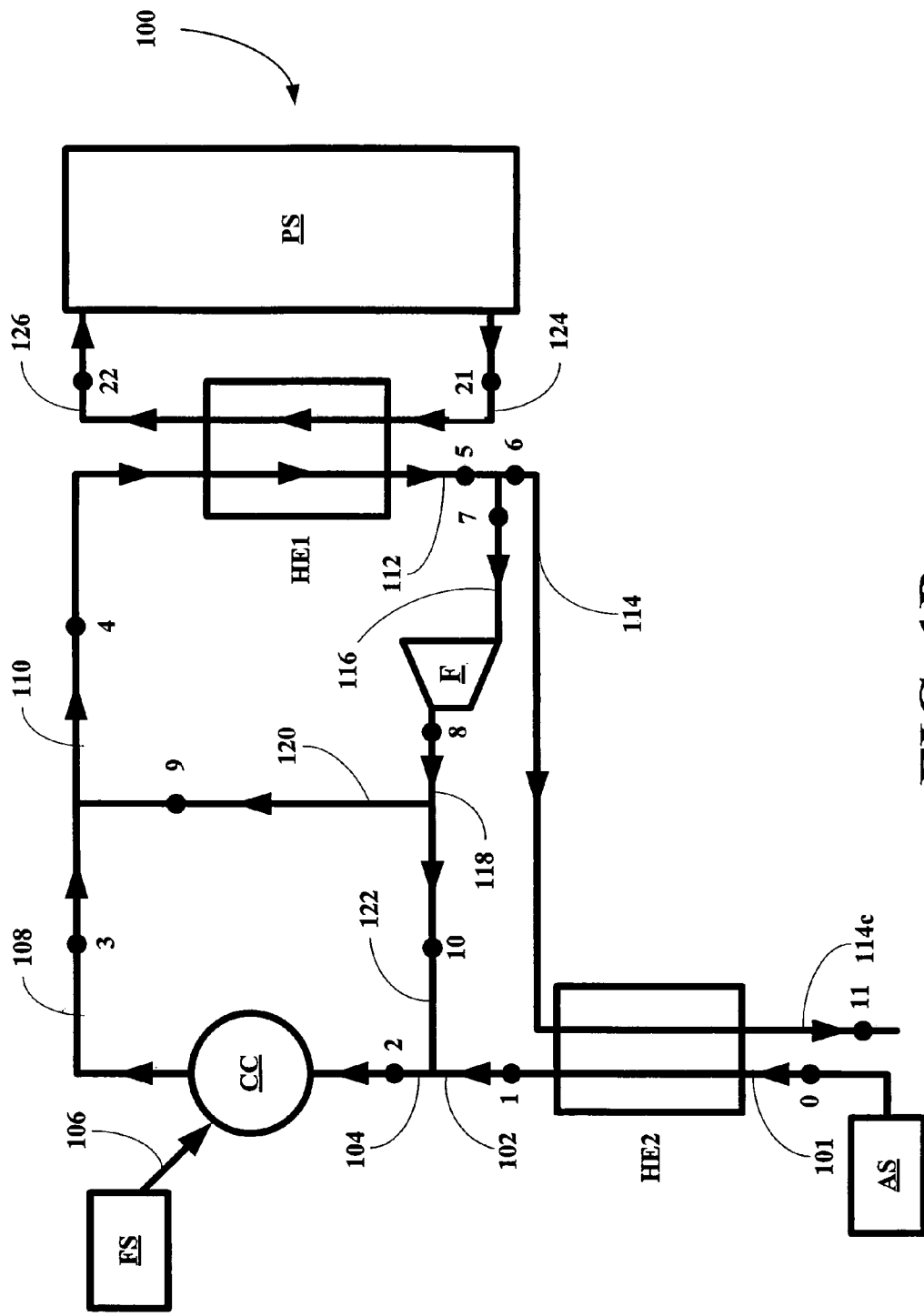
FIG. 1B depicts another preferred embodiment of a combustion apparatus of this invention feeding a power supply system.

Referring now to FIG. 1A, a basic variant of the combustion apparatus of this invention, generally 100, is shown. A stream 102 of atmospheric air having parameters as at a point 1 enters into the system 100. The air stream 102 can be pre-heated by a returning stream of flue gas as shown in FIG. 1B or can come directly from the atmosphere as shown in FIG. 1A.

The stream 102 of air having the parameters as at the point 1 is then mixed with a stream 122 of pre-cooled flue gas having parameters as at a point 10 as described below, forming an air-flue gas mixed stream 104 having parameters as at a point 2. A flow rate of air stream 102 having the parameters as at the point 1 from an air source AS (generally the atmosphere) is chosen in such a way as to provide a desired amount of excess air for the combustion process, generally a sufficient quantity of air to substantially completely combust or oxidize the fuel. It is evident that the quantity of oxygen in the mixed stream 104 having the parameters as at the point 2 contains all of the oxygen that was present in the air stream 102 having the parameters as at the point 1, and therefore, has sufficient oxygen content to support the combustion of the fuel being combusted in the combustion process.

At the same time, a fuel stream 106 is fed into a combustion chamber CC and combustion takes place inside the combustion chamber CC due to the oxidation of the fuel in the fuel stream 106 by the oxygen in the mixed stream 104. The combustion chamber CC for use in this invention can be any unit that is now used or is yet to be invented for oxidizing a flue in air to generate heat in the form of an exhaust or flue gas. If the air stream 102 having the parameters as at the point 1 were to have been sent into the combustion chamber CC directly, then the heat released in the combustion process would heat the produced flue gas to an unacceptable high temperature. But because the pre-cooled flue gas stream 122 having the parameters as at the point 10 has been added to the air stream 102 having the parameters as at the point 1, the heat produced in the combustion chamber CC must heat a substantially higher quantity of gas. As a result, the temperature achieved in the combustion chamber CC will be substantially reduced. By varying the flow rate of the mixed stream 104 having the parameters as at the point 2 it is possible to control the temperature in the combustion chamber CC. In this way, the first goal of the combustion system of this invention, i.e., to control and reduce the temperature in the combustion chamber CC, is achieved.

However, the temperature in the combustion chamber CC must still be maintained at a relatively high temperature to provide for an effective combustion of the fuel. All heat released in the combustion process is accumulated in a stream 108 of flue gas that leaves the combustion chamber CC having parameters as at a point 3. The temperature of the flue gas stream 108 having the parameters as at the point 3 is still too high for this gas to be directly sent into heat exchangers of conventional power systems. Therefore, the flue gas stream 108 having the parameters as at the point 3 is mixed with a pre-cooled flue gas stream 120 having parameters as at a point 9 forming a steam 110 of reduced temperature flue gas with parameters as at point 4. A flow rate of the stream 120 having the parameters as at the point 9 is chosen in such a way that a temperature of the stream 110 having the parameter as at the point 4 is suitable for direct utilization in HRSG or HRVG type heat exchangers of a power system.

Note that in FIG. 1, the system is depicted with only a single stream of working fluid passing thought the heat exchanger. In reality, there could be multiple streams of working fluid passing thought multiple heat exchangers.

The total heat utilized in a power system PS be conditionally divided into two parts, referred to as high temperature heat and low temperature heat. The stream 110 of flue gas having the parameters as at the point 4 passes through a first heat exchanger HE1, where it transfers its heat to a working fluid stream 124 having parameters as at a point 21 in a heat exchange process 21-22. The heat exchange process 21-22 produces a spent flue gas stream 112 having parameters as at a point 5 and a vaporized, preferably a fully vaporized, working fluid stream 126 having parameters as at a point 22. The temperature of the spent flue gas stream 112 having the parameters as at the point 5 corresponds to a lowest temperature heat of a high temperature heat portion of a total heat utilized in a power system PS.

Thereafter, the stream 112 of flue gas having the parameters as at the point 5 is divided into two substreams 112 and 116 having parameters as at points 6 and 7, respectively. The stream 116 having the parameters as at the point 7 enters into a circulating fan F, where its pressure is increased to a pressure needed to overcome a hydraulic resistance of the combustion chamber CC and the first heat exchanger HE1, and becomes a high pressure flue gas stream 118 having parameters as at a point 8. Thereafter, the stream 118 having the parameters as at the point 8 is in turn divided into the streams 120 and 122 having the parameters as at the points 9 and 10, respectively.

The stream 122 having the parameters as at the point 10 is then mixed with the stream 102 of incoming air having the parameters as at the point 1, thus forming the mixed air/flue gas stream 104 having the parameters as at the point 2 as described above.

Meanwhile, the stream 120 having the parameters as at the point 9 is mixed with the stream 108 of hot flue gas having the parameters as at the point 3 forming the stream 110 of reduced temperature flue gas having the parameters as at the point 4 as described above.

Figure 1C:
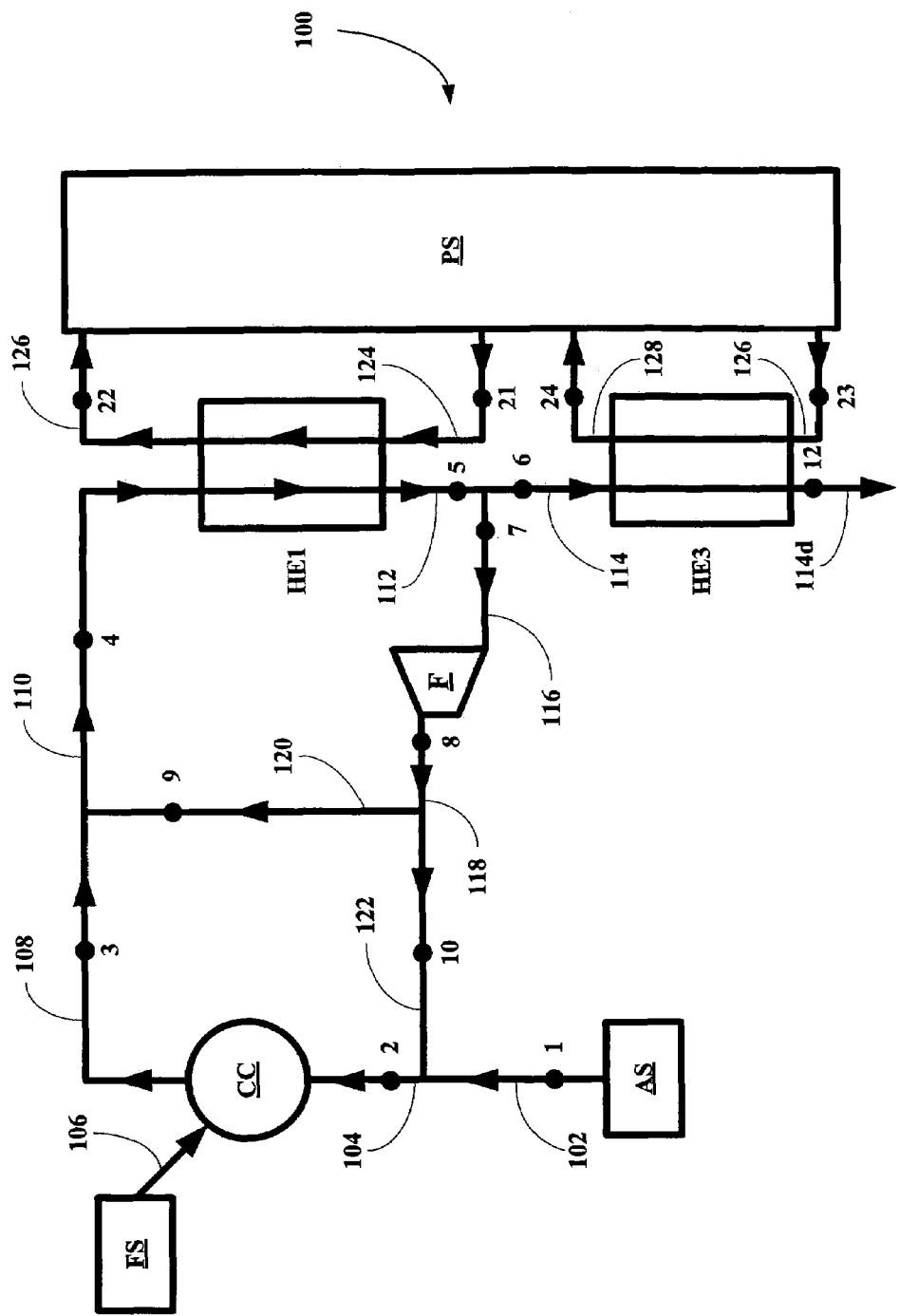
FIG. 1C depicts another preferred embodiment of a combustion apparatus of this invention feeding a power supply system.
Figure 1D:
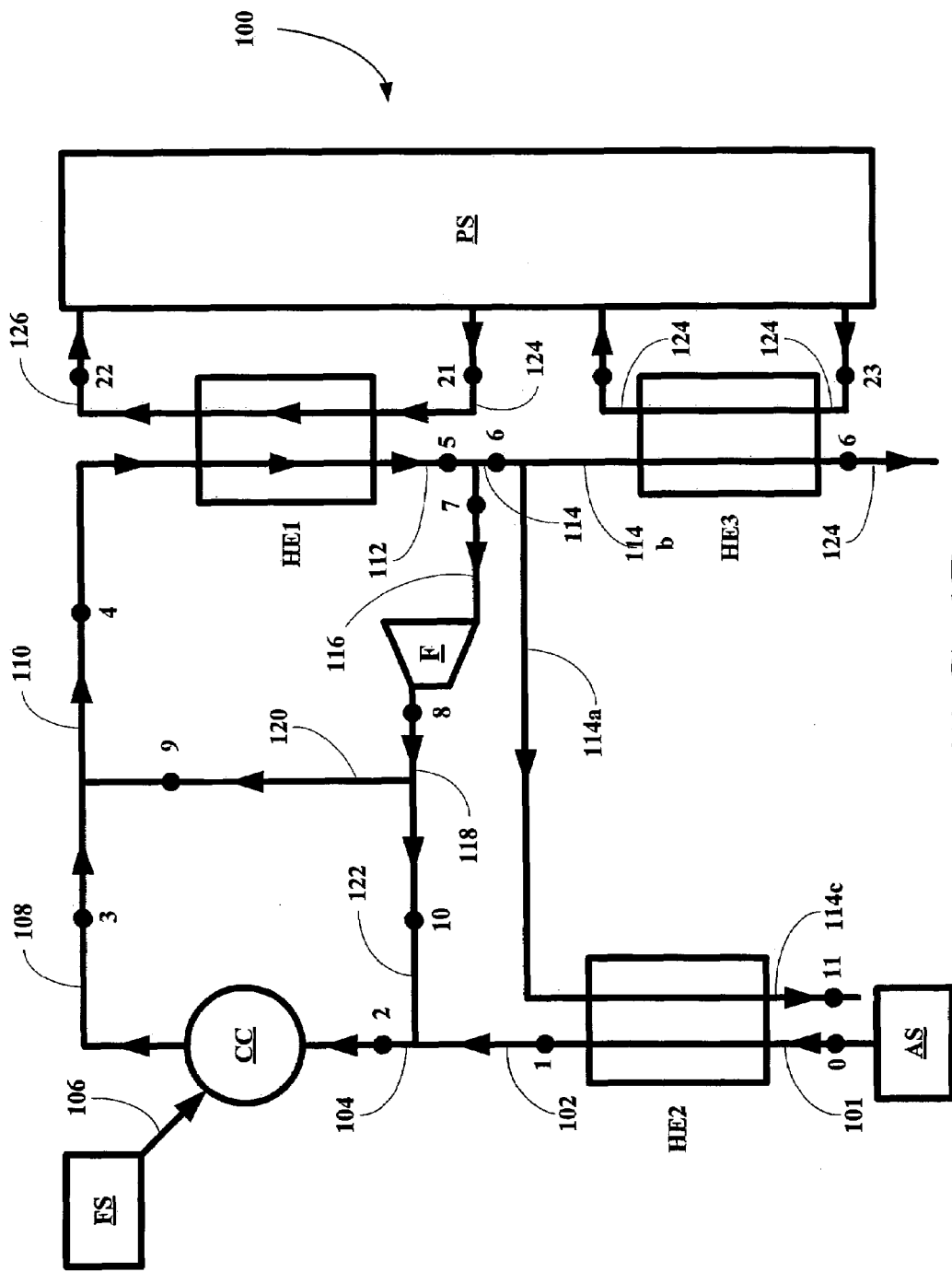
FIG. 1D depicts another preferred embodiment of a combustion apparatus of this invention feeding a power supply system.

The remaining flue gas stream 114 of flue gas having the parameters as at the point 6 can be further utilized to preheat a precursor air stream 101 having the parameters as at a point 0 in a pre-heater or second heat exchanger HE2 forming the stream 102 having the parameters as at the point 1 and a cooled flue gas stream 114c having parameter as at a point 11 as shown in FIG. 1B. Alternatively, the remaining flue gas stream 114 can be utilized in the power system PS where a working fluid stream 128 having parameters as at a point 23 is brought into a heat exchange relationship with the stream 114 forming a heated working fluid stream 130 having parameters as at a point 24 and a cooled flue gas stream 114d having parameters as at a point 12 as shown in FIG. 1C. In another alternative shown in FIG. 1D, the remaining flue gas stream 114 can be utilized both to pre-heat the incoming air stream 102 and to pre-heat a working fluid stream from the power system PS as shown in FIG. 1D. The remaining flue gas stream 114 is split into two substream 114a and 114b. The substream 114a is used to preheat a precursor air stream 101 having the parameters as at a point 0 in a pre-heater or second heat exchanger HE2 forming the stream 102 having the parameters as at the point 1 and a cooled flue gas stream 114c having parameter as at a point 11; while the substream 114b is used to preheat a working fluid stream 128 having parameters as at a point 23 is brought into a heat exchange relationship with the stream 114 forming a heated working fluid stream 130 having parameters as at a point 24 and a cooled flue gas stream 114d having parameters as at a point 12.

It is clear that recirculation of the flue gas stream 116 having the parameters as at the point 7 through the combustion chamber CC and the first heat exchanger HE1 of the power system PS does not reduce the total quantity of heat transferred to the power system PS. The high temperature portion of heat utilized by the power system PS remains the same as it would be without the recirculation of flue gas, but this heat is released in a temperature range which makes possible its effective utilization in HRSG or HRVG type heat exchangers. As a result of the recirculation, the temperature difference in the first heat exchanger HE1 is reduced. This reduction in turn can cause an increase in the required surface of the heat exchanger. However, because the temperature of the flue gas is reduced, it allows the use of finned tubes in the first heat exchanger HE1, which in turn allows for an increase in a surface area at very low extra cost. Moreover, because a flow rate of stream 110 having the parameters as at the point 4 passing though the heat exchanger HE1 is substantially higher than the flow rate of flue gases which would be produced without recirculation.

The velocity of the stream 110 inside the heat exchange HE1 is substantially increased, and this, in turn, increases a heat transfer coefficient in the first heat exchanger HE1.

Summing up, the combustion system 100 of this invention allows for the effective control of the temperature in the combustion chamber CC and of the temperature of the flue gas entering into the heat exchanger HE1. Heat stresses in the tubes of the heat exchanger(s) of the power system are drastically reduced, and instead of a complicated and expensive conventional boiler/combustor systems, a simple combustion chamber and relatively inexpensive HRSG or HRVG type heat exchangers can be used.

Although the combustion systems of this invention are shown in FIGS. 1A-D supplying cooled flue gas to a power system, the combustion system of this invention can be used to supply cooled flue gas to any other system that is designed to utilize heat derived from the combustion of waste materials. Such other systems include chemical and petro-chemical conversion units, catalytic reactor system or any other conversion units that require heating.

All references cited herein are incorporated by reference. While this invention has been described fully and completely, it should be understood that, within the scope of the appended claims, the invention may be practiced otherwise than as specifically described. Although the invention has been disclosed with reference to its preferred embodiments, from reading this description those of skill in the art may appreciate changes and modification that may be made which do not depart from the scope and spirit of the invention as described above and claimed hereafter.

I claim:

1. A method of combusting a fuel comprising the steps of:
   feeding an oxidizing gas stream and a fuel stream to a separate combustion chamber to form a hot flue gas stream, where the oxidizing gas stream comprises an effective oxidizing amount of an oxidizing agent stream and an effective cooling amount of a first recycled flue gas substream;
   mixing the hot flue gas stream with a second recycled flue gas substream to form a reduced temperature flue gas stream;
   transferring a portion of heat from the reduced temperature stream to a stream to be heated associated with a separate heat recover unit or a separate unit to be heated;
   forwarding a portion of the spent flue gas stream to a fan to increase its pressure to form a recycle flue gas stream; and
   splitting the recycled flue gas stream into the first and second recycled flue gas substreams,
   where the effective amount of the oxidizing agent stream is sufficient to produce a stoichiometric amount of oxygen to fuel or to produce a 25% or less excess of oxygen to fuel and the effective cooling amount of the recycled flue gas stream is sufficient to control a temperature of the hot flue gas to a desired high temperature and where the reduced temperature is sufficient for use in conventional heat exchangers without thermally damaging the heat exchanger.

2. The method of claim 1, wherein the heat transferring step comprises passing the reduced temperature flue gas stream and the stream to be heated through at least one heat recovery steam generator (HRSG) or a heat recovery vapor generator (HRVG) type heat exchangers associated with a power conversion system to produce a spent flue gas stream and a fully vaporized or fully vaporized and superheated stream from which thermal energy is converted to a useable form of energy.

3. The method of claim 1, wherein the heat transferring step comprises contacting the reduced temperature flue gas stream with the unit to be heated for a time sufficient to raise the temperature of the unit to a desired high temperature.

4. The method of claim 1, wherein the heat transferring step comprises passing the reduced temperature flue gas stream and the stream to be heated through at least one heat exchanger to produce a spent flue gas stream and a heated stream, where the stream is associated with a chemical conversion unit.

5. The method of claim 1, further comprising the step of:
   mixing the air stream with the first recycled flue gas substream to form the oxidizing gas stream prior to the feeding step.

6. The method of claim 5, further comprising the step of:
   preheating the air stream with a second portion of the spent flue gas stream to preheat the air stream prior the mixing step it with the first recycled flue gas substream.

7. The method of claim 1, further comprising the step of:
   preheating the stream to be heated with a third portion of the spent flue gas stream to preheat the stream to be heated prior the heat transferring step.

8. The method of claim 1, further comprising the steps of:
   mixing the air stream with the first recycled flue gas substream to form the oxidizing gas stream prior to the feeding step; and
   preheating the stream to be heated with a third portion of the spent flue gas stream to preheat the stream to be heated prior the heat transferring step.

9. The method of claim 1, further comprising the steps of:
   mixing the air stream with the first recycled flue gas substream to form the oxidizing gas stream prior to the feeding step;
   preheating the air stream with a second portion of the spent flue gas stream to preheat the air stream prior to the above mixing step; and
   preheating the stream to be heated with a third portion of the spent flue gas stream to preheat the stream to be heated prior the heat transferring step.

10. A method comprising the steps of:
    feeding an oxidizing gas stream and a fuel stream to a separate combustion chamber to form a hot flue gas stream, where the oxidizing gas stream comprises an effective oxidizing amount of an oxidizing agent stream and an effective cooling amount of a first recycled flue gas substream;
    mixing the hot flue gas stream with a second recycled flue gas substream to form a reduced temperature flue gas stream;
    transferring a portion of heat from the reduced temperature stream to a working fluid stream of a separate power generator system to form a fully vaporized or fully vaporized and superheated working fluid stream and a spent flue gas stream;
    converting a portion of thermal energy in the fully vaporized or fully vaporized and superheated working stream to produce a quantity of useable energy and to form a spent working fluid stream;
    condensing the working fluid stream to form the working fluid stream;
    forwarding a portion of the spent flue gas stream to a fan to increase its pressure to form a recycle flue gas stream; and
    splitting the recycled flue gas stream into the first and second recycled flue gas substreams,
    where the effective amount of the oxidizing agent stream is sufficient to produce a stoichiometric amount of oxygen to fuel or to produce a 25% or less excess of oxygen to fuel and the effective cooling amount of the recycled flue gas stream is sufficient to control a temperature of the hot flue gas to a desired high temperature and where the reduced temperature is sufficient for use in conventional heat exchangers without thermally damaging the heat exchanger.

11. An apparatus comprising:
an air source adapted to supply an air stream;
a fuel source adapted to supply a fuel stream;
a separate combustion chamber adapted to combust the fuel stream, where the chamber includes:
  a fuel inlet adapted to receive the fuel stream,
  an oxidizing gas inlet adapted to receive an oxidizing gas stream, and
  a flue gas outlet adapted to exhaust a hot flue gas stream from the chamber; and
a separate flue gas recycle system including:
  a first splitter adapted to divide a spent flue gas stream into a recycle flue gas stream and an exhaust stream,
  a fan adapted to pressurize the recycle flue gas stream to form a pressurized recycle flue gas stream;
  a second splitter adapted to divide the pressurized recycle flue gas stream into a first recycle flue gas substream and a second recycle flue gas substream,
  a first mixer adapted to mix the first recycle flue gas substream and the hot flue gas stream to form a reduced temperature flue gas stream adapted to transfer heat to a stream to be heated associated with a separate heat extraction system or a separate unit to be heated,
  a second mixer adapted to mix the air stream and the second recycle flue gas substream to form the oxidizing gas stream, and
  a third splitter adapted to divide the exhaust stream into a first exhaust sub stream and a second exhaust substream, where the first exhaust substream is adapted to preheat the air stream prior to it being mixed with the second recycled flue gas substream and where the second exhaust substream is adapted to preheat the stream to be heated or the unit to be heated.

12. The apparatus of claim 11, wherein the stream to be heated is a working fluid stream of a heat recovery steam generator (HRSG) or a heat recovery vapor generator (HRVG) type heat extraction subsystem associated with a power conversion system to produce a spent flue gas stream and a fully vaporized or fully vaporized and superheated stream from which thermal energy is converted to a useable form of energy.

* * * * *